US009191820B2

United States Patent
Tanaka et al.

(10) Patent No.: US 9,191,820 B2
(45) Date of Patent: Nov. 17, 2015

(54) MOBILE COMMUNICATION METHOD, SWITCH, AND MOBILE STATION

(75) Inventors: Itsuma Tanaka, Tokyo (JP); Keisuke Suzuki, Tokyo (JP); Mikio Iwamura, Tokyo (JP); Wuri Andarmawanti Hapsari, Tokyo (JP); Masashi Kanauchi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 471 days.

(21) Appl. No.: 13/642,132

(22) PCT Filed: Apr. 20, 2011

(86) PCT No.: PCT/JP2011/059736
§ 371 (c)(1),
(2), (4) Date: Dec. 20, 2012

(87) PCT Pub. No.: WO2011/132711
PCT Pub. Date: Oct. 27, 2011

(65) Prior Publication Data
US 2013/0115917 A1     May 9, 2013

(30) Foreign Application Priority Data

Apr. 20, 2010   (JP) ................ P2010-097434

(51) Int. Cl.
*H04W 4/00*   (2009.01)
*H04W 12/08*   (2009.01)
*H04W 76/02*   (2009.01)
(Continued)

(52) U.S. Cl.
CPC ............ *H04W 12/08* (2013.01); *H04W 76/027* (2013.01); *H04W 36/0022* (2013.01); *H04W 48/12* (2013.01)

(58) Field of Classification Search
CPC ........................................... H04L 12/66
USPC .............................................. 370/352
See application file for complete search history.

(56) References Cited

U.S. PATENT DOCUMENTS

| 8,279,834 B2 * | 10/2012 | Mildh ........................ 370/352 |
| 8,818,448 B2 * | 8/2014 | Kekki et al. ................ 455/552.1 |
| 2011/0199893 A1 | 8/2011 | Tanaka et al. |

FOREIGN PATENT DOCUMENTS

| JP | 2010-45428 A | 2/2010 |
| JP | 2010-45746 A | 2/2010 |

(Continued)

OTHER PUBLICATIONS

Office Action in counterpart Chinese patent Application No. 201180020092.4, mailed Sep. 2, 2014 (12 pages).

(Continued)

*Primary Examiner* — Huy C Ho
(74) *Attorney, Agent, or Firm* — Osha Liang LLP

(57) ABSTRACT

A mobile communication method according to the present invention includes the steps of: causing an switch MME to perform CSFB-related processing for a mobile station UE when receiving "Extended Service Request" during call restriction and judging that the mobile station UE supports the barring scheme for CSFB on the basis of CSFB restriction capability information; and causing the switch MME to send the mobile station UE "Service Reject" when receiving "Extended Service Request" during the call restriction and judging that the mobile station UE does not support the barring scheme for CSFB on the basis of the CSFB restriction capability information.

4 Claims, 7 Drawing Sheets

(51) Int. Cl.
*H04W 36/00* (2009.01)
*H04W 48/12* (2009.01)

(56) References Cited

FOREIGN PATENT DOCUMENTS

| JP | 2010-62595 A | 3/2010 |
|---|---|---|
| WO | 2010/021324 A1 | 2/2010 |

OTHER PUBLICATIONS

3GPP TS 23.272 V9.0.0; 3rd Generation Partnership Project; Technical Specification Group Services and System Aspects; Circuit Switched Fallback in Evolved Packet System; Stage 2 (Release 9); Jun. 2009 (50 pages).
International Search Report w/translation issued in PCT/JP2011/059736 mailed Jun. 28, 2011 (4 pages).
Motorola et al.; "Congestion Control for Enhanced 1xCS Fallback"; 3GPP TSG-RAN WG2 Meeting #69, R2-101298; San Francisco, USA; Feb. 22-26, 2010 (7 pages).
3GPP TS 24.301 V10.2.0; "3rd Generation Partnership Project; Technical Specification Group Core Network and Terminals; Non-Access-Stratum (NAS) protocol for Evolved Packet System (EPS); Stage 3 (Release 10)"; Mar. 2011 (315 pages).
3GPP TS 22.011 V10.3.0; "3rd Generation Partnership Project; Technical Specification Group Services and System Aspects; Service accessibility (Release 10)"; Mar. 2011 (25 pages).
3GPP TS 23.272 V11.2.0; "3rd Generation Partnership Project; Technical Specification Group Services and System Aspects; Circuit Switched (CS) fallback in Evolved Packet System (EPS); Stage 2 (Release 11)"; Sep. 2012 (90 pages).
NTT DoCoMo; "Discussion paper—SSAC for CSFB—"; 3GPP TSG-SA1 #49, S1-100021; San Francisco, USA; Feb. 22-26, 2010 (1 page).
NTT DoCoMo et al.; "SSAC for CSFB"; 3GPP TSG-SA WG1 Meeting #49, S1-100022; San Francisco, USA; Feb. 22-26, 2010 (2 pages).

\* cited by examiner

MOBILE COMMUNICATION METHOD, SWITCH, AND MOBILE STATION

TECHNICAL FIELD

The present invention relates to a mobile communication method, a switch, and a mobile station.

BACKGROUND ART

In a mobile communication system having both E-UTRAN (Evolved-Universal Terrestrial Radio Access Network) and UTRAN (Universal Terrestrial Radio Access Network) providing CSFB (CS Fallback), if a large number of mobile stations UE send "RRC Connection Request (RRC connection request signal)" for sending "Extended Service Request (call request signal)" for performing CSFB on particular events such as when an earthquake occurs or a new year, a problem arises in which radio resource congestion leads to disconnection of services.

To solve such a problem, taking the following first and second countermeasures is under consideration in the 3GPP.

In the first countermeasure, a radio base station eNB sends broadcast information including the restriction rate for CSFB in a cell under call restriction. Then, a mobile station UE compliant with LTE (Long Term Evolution) Release supporting the barring scheme for CSFB or later can judges whether or not to perform CSFB call processing based on such restriction information. The first countermeasure thus makes it possible to execute CSFB call restriction on the mobile station UE compliant with LTE Release supporting the barring scheme for CSFB or later.

Here, "supporting the barring scheme for CSFB" indicates having ability to load the restriction information (restriction rate) for CSFB and to make a judgment on restriction based on this restriction information (restriction rate) for CSFB.

The second countermeasure uses a procedure shown in FIG. 9 to enable call restriction on both a mobile station UE compliant with LTE Release not supporting the barring scheme for CSFB and a mobile station UE compliant with LTE Release supporting the barring scheme for CSFB or later.

Specifically, in the procedure shown in FIG. 9, upon receiving "Extended Service Request" regarding CSFB from a mobile station UE during call restriction in Step S4001, an switch MME (Mobility Management Entity) sends the mobile station UE "Service Reject" including "Cause#39" and a timer value in Step S4002.

Upon receiving "Service Reject" in Step S4003, the mobile station UE activates a timer (T3442) and cannot perform call processing until a period specified by the timer value included in "Service Reject" is over.

SUMMARY OF THE INVENTION

Problem to be Solved by the Invention

However, if both the above first and second countermeasures are applied, there is a problem that a mobile station UE compliant with LTE Release supporting the barring scheme for CSFB or later is subjected to double call restriction by the first and second countermeasures.

The present invention has been therefore made in consideration of the above problem. An objective of the present invention is to provide a mobile communication method, a switch, and a mobile station which enable proper CSFB call restriction on a mobile station irrespective of whether or not the mobile station supports the barring scheme for CSFB.

The first feature of the present invention is summarized in that a mobile communication method in a mobile communication system providing switched type communications by which a mobile station currently camping on in a cell under control of a radio access network of a first communication scheme not supporting circuit-switched communications is enabled to be switched to a cell under control of a radio access network of a second communication scheme supporting the circuit-switched communications to start the circuit-switched communications and the method comprising the steps of: causing a mobile station to send an switch of the first communication scheme a call request signal including capability information indicating whether or not the mobile station supports a barring scheme for the switched type communications; causing the switch to perform processing regarding the switched type communications for the mobile station when receiving the call request signal during call restriction and judging that the mobile station supports the barring scheme for the switched type communications on the basis of the capability information; and causing the switch to send the mobile station a call rejection signal when receiving the call request signal during the call restriction and judging that the mobile station does not support the barring scheme for the switched type communications based on the capability information.

The second feature of the present invention is summarized in that an switch used in a mobile communication system providing switched type communications by which a mobile station currently camping on in a cell under control of a radio access network of a first communication scheme not supporting circuit-switched communications is enabled to be switched to a cell under control of a radio access network of a second communication scheme supporting the circuit-switched communications to start the circuit-switched communications, the switch employing the first communication scheme, the switch comprising: a communication processing unit configured to perform processing regarding the switched type communications for a mobile station when the switch receives a call request signal from the mobile station during call restriction and judges that the mobile station supports a barring scheme for the switched type communications on the basis of capability information included in the call request signal; and a restriction unit configured to send the mobile station a call rejection signal when the switch receives the call request signal from the mobile station during the call restriction and judges that the mobile station does not support the barring scheme for the switched type communications based on the capability information included in the call request signal.

The third feature of the present invention is summarized in that a mobile station used in a mobile communication system providing switched type communications by which a mobile station currently camping on in a cell under control of a radio access network of a first communication scheme not supporting circuit-switched communications is enabled to be switched to a cell under control of a radio access network of a second communication scheme supporting the circuit-switched communications to start the circuit-switched communications, the mobile station comprising a communication processing unit configured to send an switch of the first communication scheme a call request signal including capability information indicating whether or not the mobile station supports a barring scheme for the switched type communications.

The fourth feature of the present invention is summarized in that a mobile communication method in a mobile communication system providing switched type communications by which a mobile station currently camping on in a cell under control of a radio access network of a first communication scheme not supporting circuit-switched communications is enabled to be switched to a cell under control of a radio access network of a second communication scheme supporting the circuit-switched communications to start the circuit-switched communications, the method comprising the steps of: causing an switch of the first communication scheme to acquire capability information in processing for registering a location of a mobile station, the information indicating whether or not the mobile station supports a barring scheme for the switched type communications; causing the switch to perform processing regarding the switched type communications for the mobile station when receiving a call request signal from the mobile station during call restriction and judging that the mobile station supports the barring scheme for the switched type communications on the basis of the capability information; and causing the switch to send the mobile station a call rejection signal when receiving the call request signal from the mobile station during the call restriction and judging that the mobile station does not support the barring scheme for the switched type communications based on the capability information.

The fifth feature of the present invention is summarized in that an switch used in a mobile communication system providing switched type communications by which a mobile station currently camping on in a cell under control of a radio access network of a first communication scheme not supporting circuit-switched communications is enabled to be switched to a cell under control of a radio access network of a second communication scheme supporting the circuit-switched communications to start the circuit-switched communications, the switch employing the first communication scheme, the switch comprising: an acquisition unit configured to acquire capability information in processing for registering a location of a mobile station, the information indicating whether or not the mobile station supports a barring scheme for the switched type communications; a communication processing unit configured to perform processing regarding the switched type communications for the mobile station when the switch receives a call request signal from the mobile station during call restriction and judges that the mobile station supports the barring scheme for the switched type communications on the basis of the capability information; and a restriction unit configured to send the mobile station a call rejection signal when the switch receives the call request signal from the mobile station during the call restriction and judges that the mobile station does not support the barring scheme for the switched type communications based on the capability information.

Effects of the Invention

As has been described, the present invention can provide a mobile communication method, a switch, and a mobile station which enable proper CSFB call restriction on a mobile station irrespective of whether or not the mobile station supports the barring scheme for CSFB.

MODES FOR CARRYING OUT THE INVENTION

Configuration of Mobile Communication System
According to First Embodiment of Present Invention A description will be given of a mobile communication system according to a first embodiment of the present invention with reference to FIGS. 1 and 2.

Figure 1:
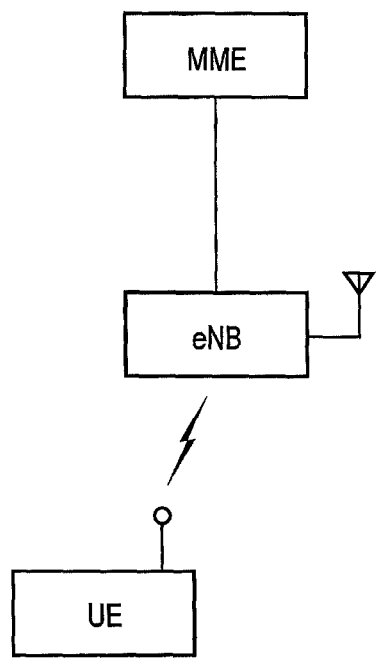
FIG. 1 is an overall configuration diagram of a mobile communication system according to a first embodiment of the present invention.

As shown in FIG. 1, the mobile communication system according to this embodiment is a mobile communication system accommodating a LTE radio access network, and includes: a switch MME; and a radio base station eNB.

In addition, the mobile communication system according to this embodiment is configured to be capable of providing CSFB to one or more mobile stations UE which are currently camping on in a cell under control of the LTE radio access network.

Figure 2:
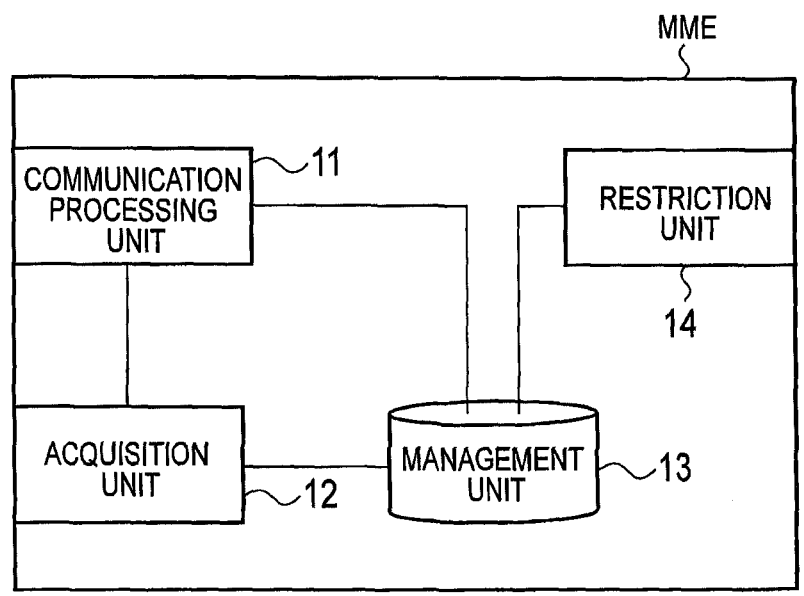
FIG. 2 is a functional block diagram of a switch according to the first embodiment of the present invention.

As shown in FIG. 2, the switch MME includes: a communication processing unit 11; an acquisition unit 12; a management unit 13; and a restriction unit 14.

The communication processing unit 11 is configured to perform communication processing such as CSFB-related processing.

The acquisition unit 12 is configured to acquire CSFB restriction capability information included in "Extended Service Request" received from each mobile station UE.

Here, the CSFB restriction capability information is information indicating whether or not the barring scheme for CSFB is supported.

Note that the CSFB restriction capability information may be a LTE release number or the like. For example, "Release-8" which is sent as the CSFB restriction capability information is information indicating that the barring scheme for CSFB is not supported; whereas a release number of "Release-9" or later which is sent as the CSFB restriction capability information is information indicating that the barring scheme for CSFB is supported.

The management unit 13 is configured to manage the CSFB restriction capability information acquired from each mobile station UE by the acquisition unit 12.

The restriction unit 14 is configured to perform various kinds of restriction (such as normal originating call restriction and CSFB call restriction) in the cell under control of the radio base station eNB under control of the switch MME.

For example, the restriction unit 14 is configured to send "Service Reject" to a mobile station UE (such as a mobile station UE compliant with LTE/Release-8) when receiving "Extended Service Request" from the mobile station UE during call restriction and judging that the mobile station UE does not support the barring scheme for CSFB on the basis of the CSFB restriction capability information included in "Extended Service Request."

In the meantime, the communication processing unit 11 is configured to perform CSFB-related processing for a mobile station UE (such as a mobile station UE compliant with LTE/Release-9 or later) when receiving "Extended Service Request" from the mobile station UE during the call restriction and judging that the mobile station UE supports the barring scheme for CSFB on the basis of the CSFB restriction capability information included in "Extended Service Request."

Figure 3:
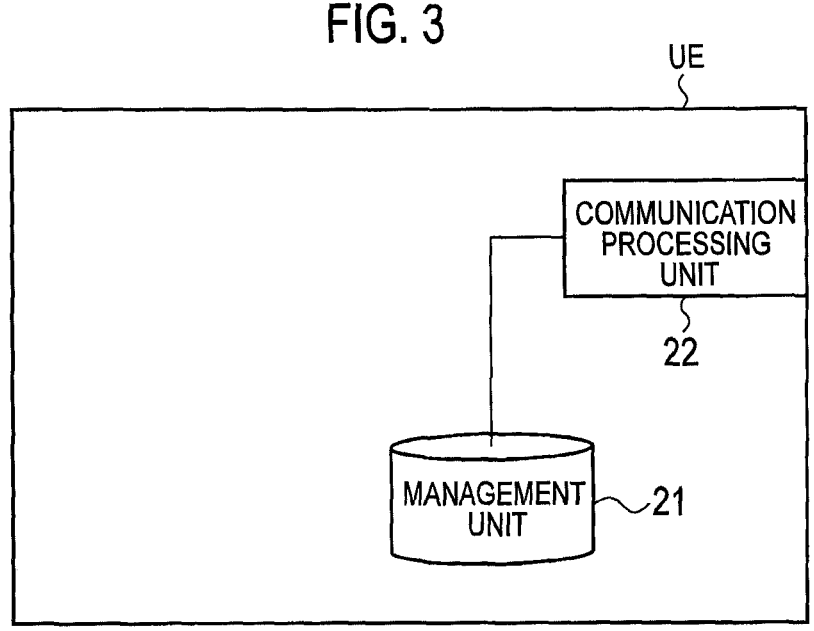
FIG. 3 is a functional block diagram of a mobile station according to the first embodiment of the present invention.

As shown in FIG. 3, the mobile station UE, compliant with LTE Release supporting the barring scheme for CSFB or later, includes: a management unit 21; and a communication processing unit 22.

The management unit 21 is configured to manage a LTE release number employed in the mobile station UE. Here, the management unit 21 may be configured to manage information indicating whether or not the mobile station UE supports the barring scheme for CSFB, in addition to the LTE release number.

The communication processing unit 22 is configured to perform communication processing such as ordinary call processing and CSFB call processing.

For example, the communication processing unit 22 is configured to send the switch MME "Extended Service Request (NAS signal)" including the CSFB restriction capability information indicating whether or not the barring scheme for CSFB is supported, if judging that the unit 22 can perform the CSFB call processing taking the CSFB restriction information into consideration.

Operation of Mobile Communication System According to First Embodiment of Present Invention Hereinbelow, a description will be given of an operation of the mobile communication system according to the first embodiment of the present invention during the call restriction with reference to FIG. 4.

Figure 4:
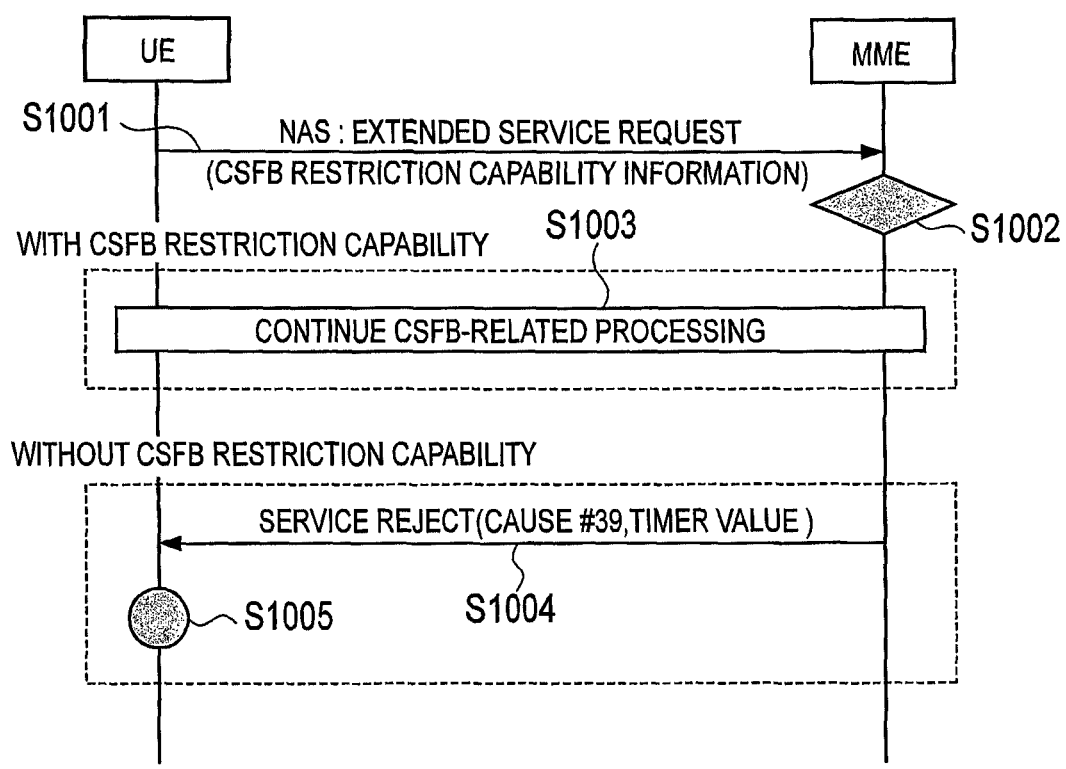
FIG. 4 is a sequence diagram illustrating an operation of the mobile communication system according to the first embodiment of the present invention.

As shown in FIG. 4, in Step S1001, a mobile station UE sends the switch MME "Extended Service Request" including the CSFB restriction capability information of the mobile station UE, if judging that the mobile station can perform CSFB call processing.

In Step S1002, the switch MME judges whether or not the mobile station UE supports the barring scheme for CSFB on the basis of the CSFB restriction capability information included in "Extended Service Request."

If the switch MME judges that the mobile station UE supports the barring scheme for CSFB, the CSFB-related processing for the mobile station UE continues in Step S1003.

On the other hand, if judging that the mobile station UE does not support the barring scheme for CSFB, the switch MME sends the mobile station UE "Service Reject" including "Cause#39" and a timer value in Step S1004.

Upon receiving "Service Reject" in Step S1005, the mobile station UE activates a timer (T3442) and suspends the call processing until a period specified by the timer value included in "Service Reject" is over.

Operational Effect of Mobile Communication System According to First Embodiment of Present Invention In the mobile communication system according to the first embodiment of the present invention, when the switch MME receives "Extended Service Request" during the call restriction from the mobile station UE not supporting the barring scheme for CSFB, the switch MME does not perform CSFB call processing for this mobile station UE. On the other hand, when the switch MME receives "Extended Service Request" during the call restriction from the mobile station UE supporting the barring scheme for CSFB, the switch MME performs CSFB call processing for this mobile station UE. This enables proper call restriction while preventing double restriction on the mobile station UE supporting the barring scheme for CSFB.

Second Embodiment of Present Invention

A description will be given of a mobile communication system according to a second embodiment of the present invention with reference to FIGS. 5 and 6. Hereinbelow, the mobile communication system according to this embodiment will be described while focusing on the difference from the mobile communication system according to the first embodiment described above.

In the mobile communication system according to this embodiment, an acquisition unit 12 of an switch MME is configured to acquire CSFB restriction capability information in processing for registering a location of a mobile station UE through "Attach Request (or Tracking Area Update)," the CSFB restriction capability information indicating whether or not the mobile station UE supports the barring scheme for CSFB.

Hereinbelow, a description will be given of an operation of the mobile communication system according to the second embodiment of the present invention during call restriction with reference to FIGS. 5 and 6.

Figure 5:
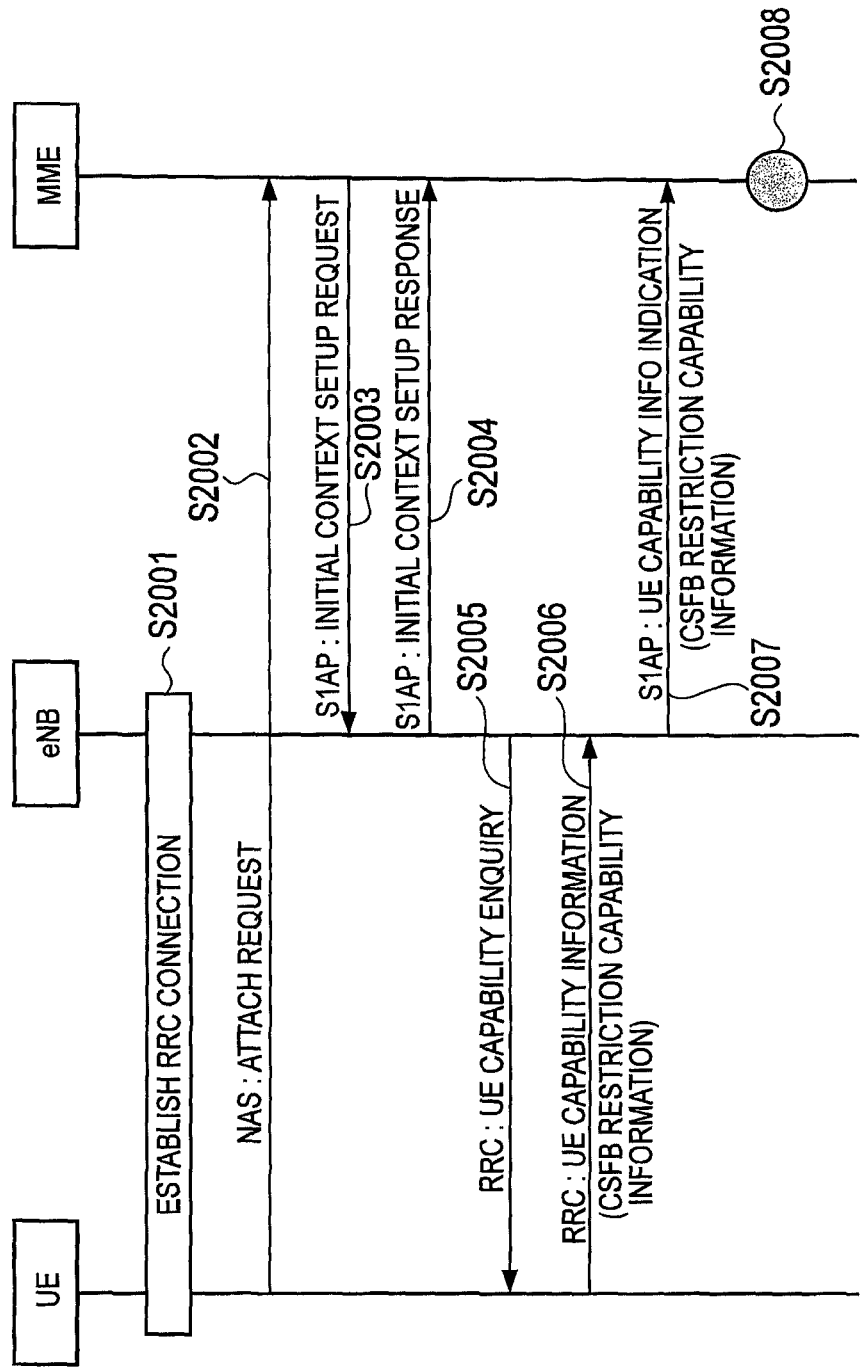
FIG. 5 is a sequence diagram illustrating an operation of a mobile communication system according to a second embodiment of the present invention.

As shown in FIG. 5, a mobile station UE establishes a RRC connection with a radio base station eNB in Step S2001, and then sends the switch MME "Attach Request (or Tracking Area Update)" through this RRC connection in Step S2002.

In Step S2003, the switch MME sends the radio base station eNB "Initial Context Setup Request." In Step S2004, the radio base station eNB sends the switch MME "Initial Context Setup Response."

In Step S2005, the radio base station eNB sends the mobile station UE "UE Capability Enquiry." In Step S2006, the mobile station UE sends the radio base station eNB "UE Capability Information" including CSFB restriction capability information of the mobile station UE.

In Step S2007, the radio base station eNB sends the switch MME "UE Capability Info Indication" including the CSFB restriction capability information.

In Step S2008, the switch MME acquires the CSFB restriction capability information from "UE Capability Info Indication," and lets a management unit 13 manage the CSFB restriction capability information.

Figure 6:
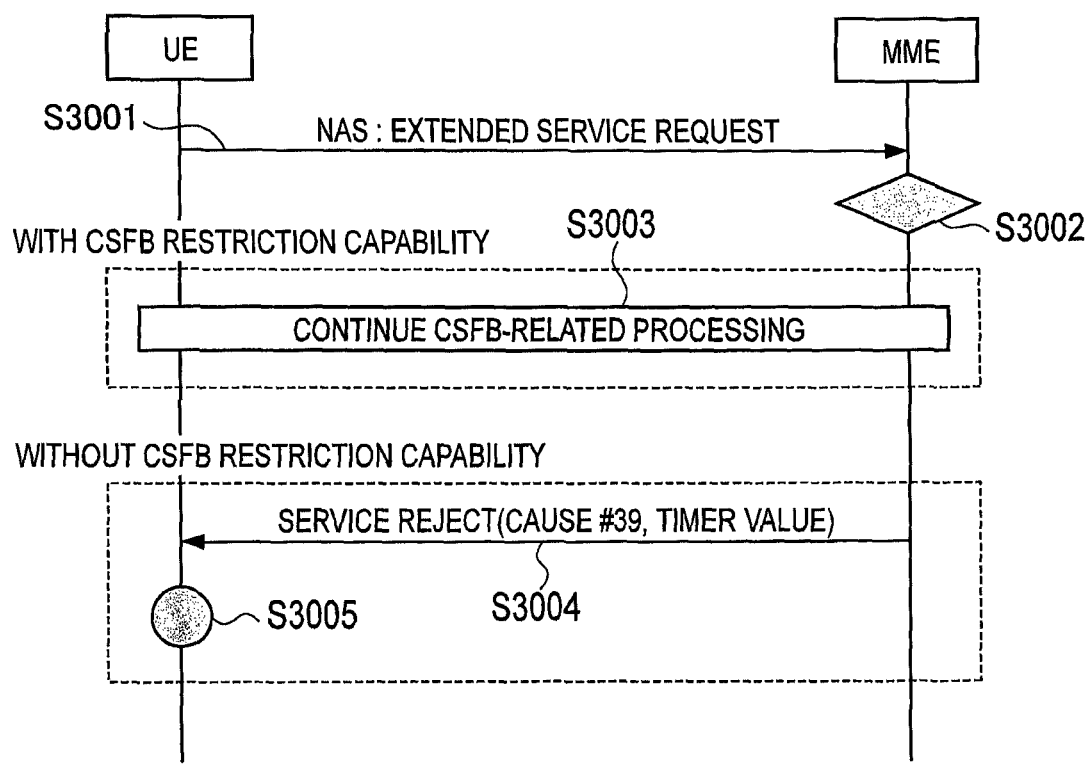
FIG. 6 is a sequence diagram illustrating the operation of the mobile communication system according to the second embodiment of the present invention.

Next, as shown in FIG. 6, in Step S3001, the mobile station UE sends the switch MME "Extended Service Request" if judging that the mobile station can perform CSFB call processing.

Upon receiving "Extended Service Request," in Step S3002 the switch MME judges whether or not the mobile station UE supports the barring scheme for CSFB based on the CSFB restriction capability information managed by the management unit 13.

If the switch MME judges that the mobile station UE supports the barring scheme for CSFB, the CSFB-related processing for the mobile station UE continues in Step S3003.

On the other hand, if judging that the mobile station UE does not support the barring scheme for CSFB, the switch MME sends the mobile station UE "Service Reject" including "Cause#39" and a timer value in Step S3004.

Upon receiving "Service Reject" in Step S3005, the mobile station UE activates a timer (T3442) and suspends the call processing until a period specified by the timer value included in "Service Reject" is over.

Third Embodiment of Present Invention

A description will be given of a mobile communication system according to a third embodiment of the present invention with reference to FIGS. 7 and 8. Hereinbelow, the mobile communication system according to this embodiment will be described while focusing on the difference from the mobile communication system according to the second embodiment described above.

In the mobile communication system according to this embodiment, an acquisition unit 12 of an switch MME is configured to acquire CSFB restriction capability information in processing for registering a location of a mobile station UE by use of "Attach Request (or Tracking Area Update)," the CSFB restriction capability information indicating whether or not the mobile station UE supports the barring scheme for CSFB.

Hereinbelow, a description will be given of an operation of the mobile communication system according to the third embodiment of the present invention during call restriction with reference to FIGS. 7 and 8.

Figure 7:
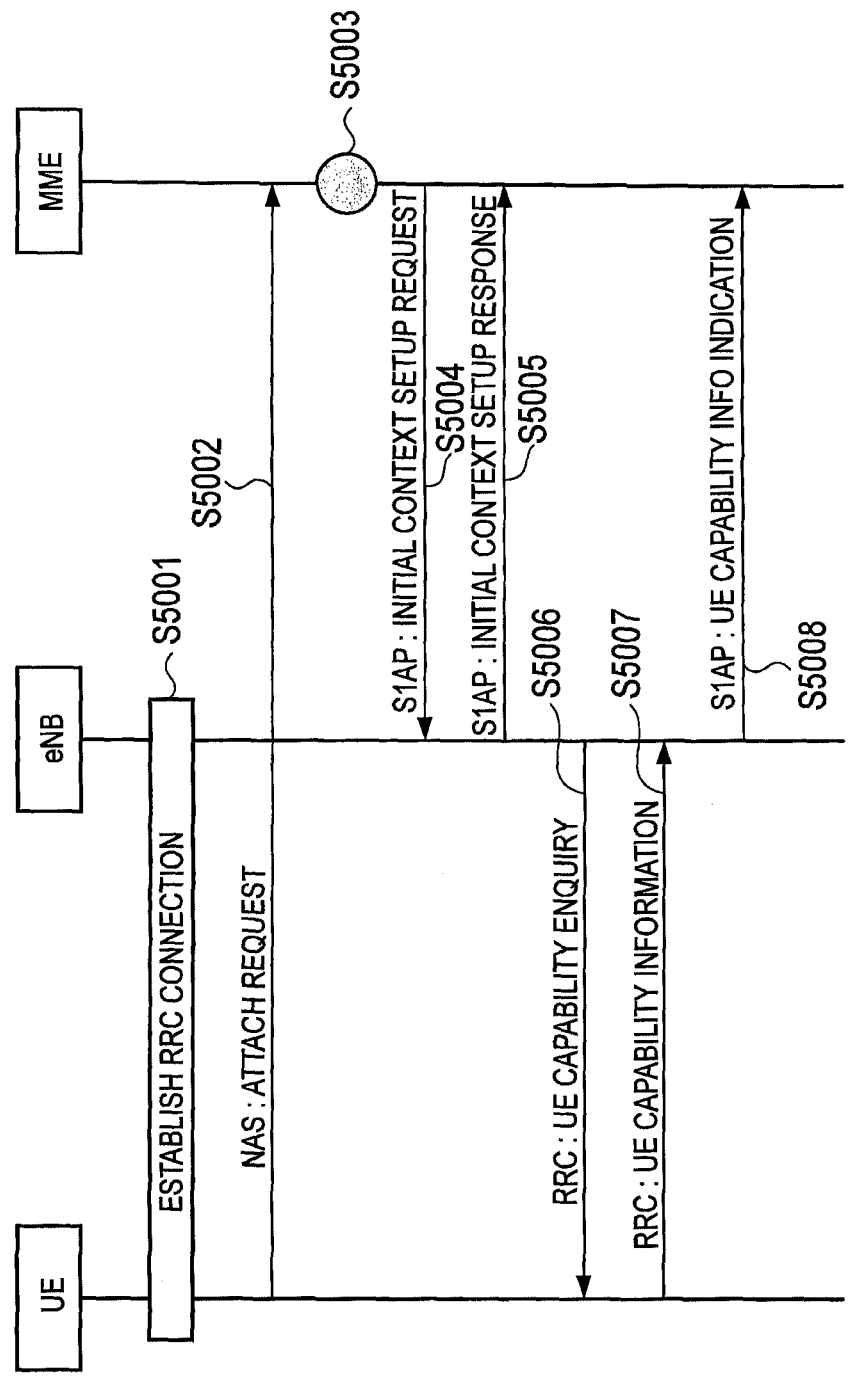
FIG. 7 is a sequence diagram illustrating an operation of a mobile communication system according to a third embodiment of the present invention.

As shown in FIG. 7, a mobile station UE establishes a RRC connection with a radio base station eNB in Step S5001, and then sends the switch MME "Attach Request (or Tracking Area Update)" including its CSFB capability, through this RRC connection in Step S5002.

In Step S5003, the switch MME acquires the CSFB restriction capability information from "Attach Request (or Tracking Area Update)," and lets a management unit 13 manage the CSFB restriction capability information.

In Step S5004, the switch MME sends the radio base station eNB "Initial Context Setup Request." In Step S5005, the radio base station eNB sends the switch MME "Initial Context Setup Response."

In Step S5006, the radio base station eNB sends the mobile station UE "UE Capability Enquiry." In Step S5007, the mobile station UE sends the radio base station eNB "UE Capability Information."

In Step S5008, the radio base station eNB sends the switch MME "UE Capability Info Indication."

Figure 8:
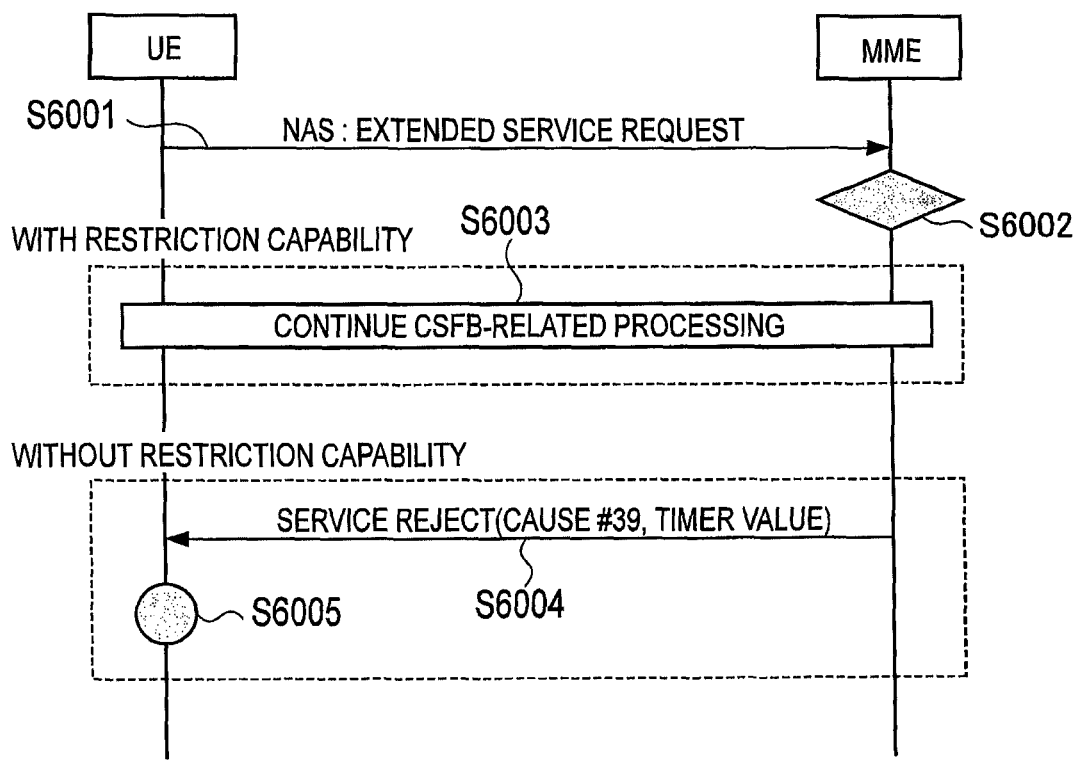
FIG. 8 is a sequence diagram illustrating the operation of the mobile communication system according to the third embodiment of the present invention.
Figure 9:
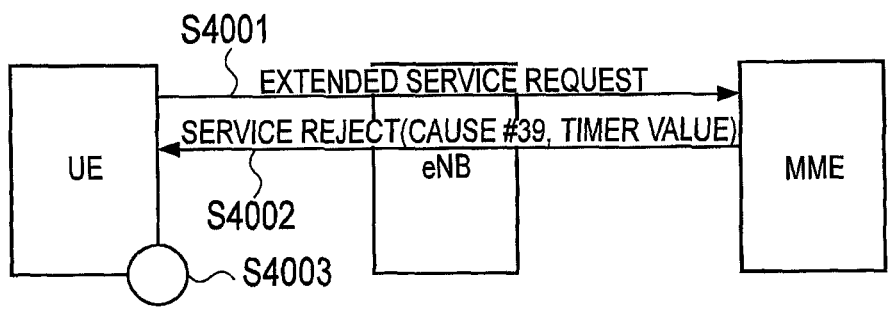
FIG. 9 is a sequence diagram illustrating an operation of a conventional mobile communication system.

Next, as shown in FIG. 8, in Step S6001, the mobile station UE sends the switch MME "Extended Service Request" if judging that the mobile station can perform CSFB call processing.

Upon receiving "Extended Service Request," in Step S6002 the switch MME judges whether or not the mobile station UE supports the barring scheme for CSFB based on the CSFB restriction capability information managed by the management unit 13.

If the switch MME judges that the mobile station UE supports the barring scheme for CSFB, the CSFB-related processing for the mobile station UE continues in Step S6003.

On the other hand, if judging that the mobile station UE does not support the barring scheme for CSFB, the switch MME sends the mobile station UE "Service Reject" including "Cause#39" and a timer value in Step S6004.

Upon receiving "Service Reject" in Step S6005, the mobile station UE activates a timer (T3442) and suspends the call processing until a period specified by the timer value included in "Service Reject" is over.

The features of the embodiments described above may be expressed as follows.

The first feature of the embodiments is summarized in that a mobile communication method in a mobile communication system providing CSFB (switched type communications) by which a mobile station UE currently camping on in a cell under control of E-UTRAN (a radio access network of a first communication scheme not supporting circuit-switched communications) is enabled to be switched to a cell under control of UTRAN (a radio access network of a second communication scheme supporting the circuit-switched communications) to start the circuit-switched communications and the method includes the steps of: causing a mobile station UE to send an switch MME (an switch of the first communication scheme) "Extended Service Request (a call request signal)" including CSFB restriction capability information (capability information) indicating whether or not the mobile station supports a CSFB (switched type communications) barring scheme; causing the switch MME to perform CSFB-related processing for the mobile station UE when receiving "Extended Service Request" during call restriction and judging that the mobile station UE supports the barring scheme for CSFB on the basis of the CSFB restriction capability information; and causing the switch MME to send the mobile station UE "Service Reject (a call rejection signal)" when receiving "Extended Service Request" during the call restriction and judging that the mobile station UE does not support the barring scheme for CSFB on the basis of the CSFB restriction capability information.

The second feature of the embodiments is summarized in that a switch MME used in the mobile communication system providing CSFB and the switch includes: a communication processing unit 11 configured to perform CSFB-related processing for a mobile station UE when receiving "Extended Service Request" from the mobile station UE during call restriction and judging that the mobile station UE supports the barring scheme for CSFB on the basis of the CSFB restriction capability information included in "Extended Service Request;" and a restriction unit 14 configured to send the mobile station UE "Service Reject" when receiving "Extended Service Request" from the mobile station UE during the call restriction and judging that the mobile station UE does not support the barring scheme for CSFB on the basis of the CSFB restriction capability information included in "Extended Service Request."

The third feature of the embodiments is summarized in that a mobile station UE used in the mobile communication system providing CSFB and the mobile station includes a communication processing unit 22 configured to send an switch MME "Extended Service Request" including CSFB restriction capability information indicating whether or not the mobile station supports the barring scheme for CSFB.

The fourth feature of the embodiments is summarized in that a mobile communication method in the mobile communication system providing CSFB and the method includes the steps of: causing an switch MME to acquire CSFB restriction capability information in processing for registering a location of a mobile station UE, the information indicating whether or not the mobile station UE supports a barring scheme for CSFB; causing the switch MME to perform CSFB-related processing for the mobile station UE when receiving "Extended Service Request" from the mobile station UE during call restriction and judging that the mobile station UE supports the barring scheme for CSFB on the basis of the CSFB restriction capability information; and causing the switch MME to send the mobile station UE "Service Reject" when receiving "Extended Service Request" from the mobile station UE during the call restriction and judging that the mobile station UE does not support the barring scheme for CSFB on the basis of the CSFB restriction capability information.

The fifth feature of the embodiments is summarized in that a switch MME used in the mobile communication system providing CSFB and the switch includes: an acquisition unit 12 configured to acquire CSFB restriction capability information in processing for registering a location of a mobile station UE, the information indicating whether or not the mobile station supports a barring scheme for CSFB; a communication processing unit 11 configured to perform CSFB-related processing for the mobile station UE when receiving "Extended Service Request" from the mobile station UE during call restriction and judging that the mobile station UE supports the barring scheme for CSFB on the basis of the CSFB restriction capability information; and a restriction unit 14 configured to send the mobile station UE "Service Reject" when receiving "Extended Service Request" from the mobile station UE during the call restriction and judging that the mobile station UE does not support the barring scheme for CSFB on the basis of the CSFB restriction capability information.

It should be noted that the operations of the switch MME, the radio base station eNB, and the mobile station UE described above may be implemented by hardware, a software module executed by a processor, or a combination of both.

Such a software module may be provided in any type of storage medium such as a RAM (Random Access Memory), a flash memory, a ROM (Read Only Memory), an EPROM (Erasable Programmable ROM), an EEPROM (Electronically Erasable and Programmable ROM), a register, a hard disk drive, a removable disk, or a CD-ROM.

Such a storage medium is connected to a processor so that the processor can read and write information from and to the storage medium. Alternatively, the storage medium may be integrated in the processor. Further, the storage medium and the processor may be provided in an ASIC, and the ASIC may be provided in the switch MME, the radio base station eNB, and the mobile station UE. Alternatively, the storage medium and the processor may be provided in the switch MME, the radio base station eNB, and the mobile station UE as discrete components.

Hereinabove, the present invention has been described in detail using the above embodiments; however, it is apparent to those skilled in the art that the present invention is not limited to the embodiments described herein. Modifications and variations of the present invention can be made without departing from the gist and scope of the present invention defined by the description of the scope of claims. Thus, what is described herein is for illustrative purpose, and has no intention whatsoever to limit the present invention.

INDUSTRIAL APPLICABILITY

As has been described, the present invention can provide a mobile communication method, a switch, and a mobile station which enable proper CSFB call restriction on a mobile station irrespective of whether or not the mobile station supports the barring scheme for CSFB.

EXPLANATION OF REFERENCE NUMERALS eNB radio base station
MME switch
UE mobile station

11, 22 communication processing unit
12 acquisition unit
13, 21 management unit
14 restriction unit

The invention claimed is:

1. A mobile communication method in a mobile communication system providing switched type communications by which a mobile station currently camping on in a cell under control of a radio access network of a first communication scheme not supporting circuit-switched communications is enabled to be switched to a cell under control of a radio access network of a second communication scheme supporting the circuit-switched communications to start the circuit-switched communications, the method comprising the steps of:
   causing a mobile station to send a switch of the first communication scheme a call request signal including capability information indicating whether or not the mobile station supports a barring scheme for the switched type communications;
   causing the switch to perform processing regarding the switched type communications for the mobile station when receiving the call request signal during call restriction and judging that the mobile station supports the barring scheme for the switched type communications on the basis of the capability information; and
   causing the switch to send the mobile station a call rejection signal when receiving the call request signal during the call restriction and judging that the mobile station does not support the barring scheme for the switched type communications based on the capability information.

2. A switch used in a mobile communication system providing switched type communications by which a mobile station currently camping on in a cell under control of a radio access network of a first communication scheme not supporting circuit-switched communications is enabled to be switched to a cell under control of a radio access network of a second communication scheme supporting the circuit-switched communications to start the circuit-switched communications, the switch employing the first communication scheme, the switch comprising a processor configured to:
   perform processing regarding the switched type communications for a mobile station when the switch receives a call request signal from the mobile station during call restriction and judges that the mobile station supports a barring scheme for the switched type communications on the basis of capability information included in the call request signal; and
   send the mobile station a call rejection signal when the switch receives the call request signal from the mobile station during the call restriction and judges that the mobile station does not support the barring scheme for the switched type communications based on the capability information included in the call request signal.

3. A mobile communication method in a mobile communication system providing switched type communications by which a mobile station currently camping on in a cell under control of a radio access network of a first communication scheme not supporting circuit-switched communications is enabled to be switched to a cell under control of a radio access network of a second communication scheme supporting the circuit-switched communications to start the circuit-switched communications, the method comprising the steps of:
   causing a switch of the first communication scheme to acquire capability information in processing for registering a location of a mobile station, the information indicating whether or not the mobile station supports a barring scheme for the switched type communications;

causing the switch to perform processing regarding the switched type communications for the mobile station when receiving a call request signal from the mobile station during call restriction and judging that the mobile station supports the barring scheme for the switched type communications on the basis of the capability information; and causing the switch to send the mobile station a call rejection signal when receiving the call request signal from the mobile station during the call restriction and judging that the mobile station does not support the barring scheme for the switched type communications based on the capability information.

4. A switch used in a mobile communication system providing switched type communications by which a mobile station currently camping on in a cell under control of a radio access network of a first communication scheme not supporting circuit-switched communications is enabled to be switched to a cell under control of a radio access network of a second communication scheme supporting the circuit-switched communications to start the circuit-switched communications, the switch employing the first communication scheme, the switch comprising a processor configured to:

acquire capability information in processing for registering a location of a mobile station, the information indicating whether or not the mobile station supports a barring scheme for the switched type communications;

perform processing regarding the switched type communications for the mobile station when the switch receives a call request signal from the mobile station during call restriction and judges that the mobile station supports the barring scheme for the switched type communications on the basis of the capability information; and send the mobile station a call rejection signal when the switch receives the call request signal from the mobile station during the call restriction and judges that the mobile station does not support the barring scheme for the switched type communications based on the capability information.

* * * * *